US012637979B2

(12) United States Patent
Zsiga et al.

(10) Patent No.: US 12,637,979 B2
(45) Date of Patent: May 26, 2026

(54) GEAR CHANGING SYSTEM FOR AN ACCESSORY GEARBOX OF AN AIRCRAFT TURBINE ENGINE AND METHOD OF USE

(71) Applicant: SAFRAN AIRCRAFT ENGINES, Paris (FR)

(72) Inventors: Zoltan Zsiga, Moissy-Cramayel (FR); Luc Henri Chatenet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/872,324

(22) PCT Filed: Jul. 3, 2023

(86) PCT No.: PCT/EP2023/068195
§ 371 (c)(1),
(2) Date: Dec. 6, 2024

(87) PCT Pub. No.: WO2024/012909
PCT Pub. Date: Jan. 18, 2024

(65) Prior Publication Data
US 2025/0369396 A1      Dec. 4, 2025

(30) Foreign Application Priority Data
Jul. 13, 2022    (FR) ...................................... 2207212

(51) Int. Cl.
*F02C 7/32*          (2006.01)
*B64D 33/00*         (2006.01)
(Continued)

(52) U.S. Cl.
CPC ................ *F02C 7/32* (2013.01); *B64D 33/00* (2013.01); *F02C 7/06* (2013.01); *F16H 3/54* (2013.01);
(Continued)

(58) Field of Classification Search
CPC ..... F02C 7/32; F02C 7/36; F02C 7/06; B64D 33/00
See application file for complete search history.

(56) References Cited

U.S. PATENT DOCUMENTS 5,012,906 A * 5/1991 Meyer ................... F16D 43/284
                                                       60/624
9,840,969 B2* 12/2017 Sheridan ................... F16H 1/48
(Continued)

FOREIGN PATENT DOCUMENTS

CN          106438880 A      2/2017

OTHER PUBLICATIONS

French Search Report and Written Opinion for FR2207212, dated Feb. 2, 2023, 9 pages.
(Continued)

*Primary Examiner* — Michael A Riegelman
(74) *Attorney, Agent, or Firm* — Rankin, Hill & Clark LLP

(57)          ABSTRACT
A gear changing system for the driving of an apparatus by an accessory gearbox including a train including a ring gear, a planetary gear integral with an output shaft and a planet carrier integral with an input shaft, a clutch device for the input shaft and output shaft, and a locking device. The system including a first configuration in which the clutch device is in the engaged position and the locking device is in the disconnected position, to drive the output shaft at the speed of the input shaft, and a second configuration in which the clutch device is in the disengaged position and the locking device is in the connected position, to drive the output shaft at a speed higher than the speed of the input shaft.

8 Claims, 5 Drawing Sheets

(51) Int. Cl.
  *F02C 7/06* (2006.01)
  *F16H 3/54* (2006.01)
(52) U.S. Cl.
  CPC .............. *F05D 2260/40311* (2013.01); *F16H 2200/0034* (2013.01); *F16H 2200/2005* (2013.01); *F16H 2200/2082* (2013.01); *F16H 2200/2094* (2013.01)

(56) References Cited

U.S. PATENT DOCUMENTS

| | | | | |
|---|---|---|---|---|
| 10,221,770 B2 * | 3/2019 | Sheridan | .................... | F02C 7/06 |
| 10,508,601 B2 * | 12/2019 | Sheridan | ................. | F02C 7/268 |
| 10,634,053 B2 * | 4/2020 | Schwarz | ............. | F16H 57/0471 |
| 11,226,014 B2 * | 1/2022 | Bortoli | .................. | F16D 25/123 |
| 11,364,797 B1 * | 6/2022 | Hayes | ....................... | F16H 3/54 |
| 11,873,765 B1 * | 1/2024 | Humes | ....................... | F02C 7/32 |
| 12,385,442 B1 * | 8/2025 | Piazza | ........................ | F02C 7/36 |
| 12,435,645 B2 * | 10/2025 | Piazza | ........................ | F02C 7/06 |
| 12,442,314 B2 * | 10/2025 | Piazza | ........................ | F02C 7/06 |
| 2004/0258539 A1 * | 12/2004 | Iwanami | ................... | F02C 7/36 |
| | | | | 417/313 |
| 2012/0159965 A1 * | 6/2012 | Papandreas | ............... | F02C 7/08 |
| | | | | 60/793 |
| 2018/0237154 A1 * | 8/2018 | Tanaka | ..................... | H02K 7/18 |
| 2021/0102499 A1 * | 4/2021 | Leque | ..................... | F16H 57/02 |
| 2021/0108569 A1 * | 4/2021 | Devendorf | ................ | F02K 3/06 |
| 2022/0010733 A1 * | 1/2022 | Matsuda | ............... | F16H 37/021 |
| 2025/0116206 A1 * | 4/2025 | Piazza | ........................ | F02C 7/06 |
| 2025/0116207 A1 * | 4/2025 | Piazza | ........................ | F02C 7/36 |
| 2025/0122834 A1 * | 4/2025 | Landry-Drolet | ........ | B64C 27/12 |

OTHER PUBLICATIONS

International Search Report for PCT/EP2023/068195, dated Aug. 28, 2023, 2 pages.

* cited by examiner

[Fig. 1]
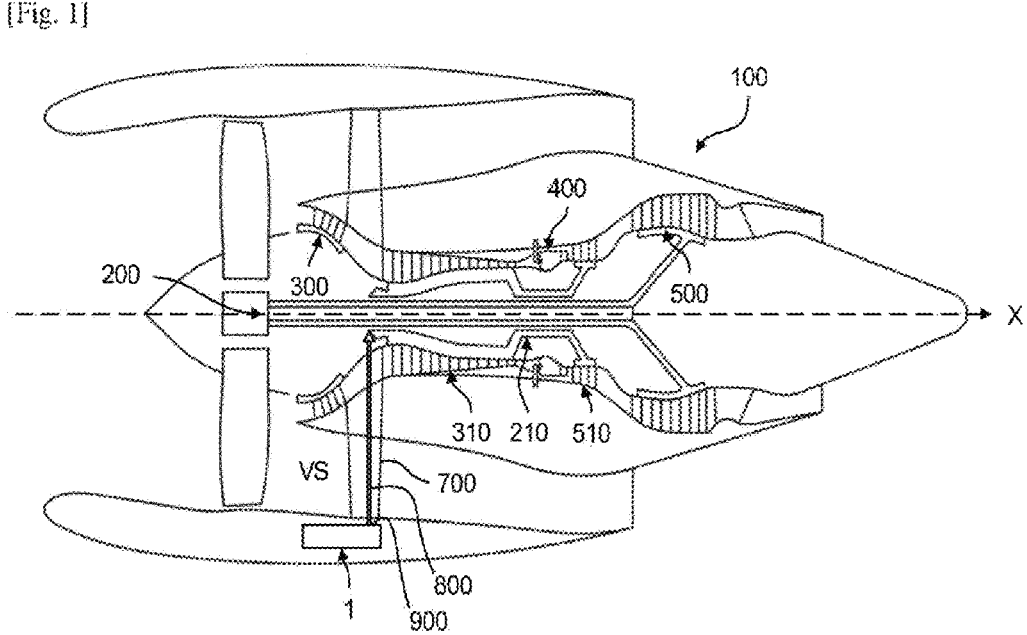
[Fig. 2]
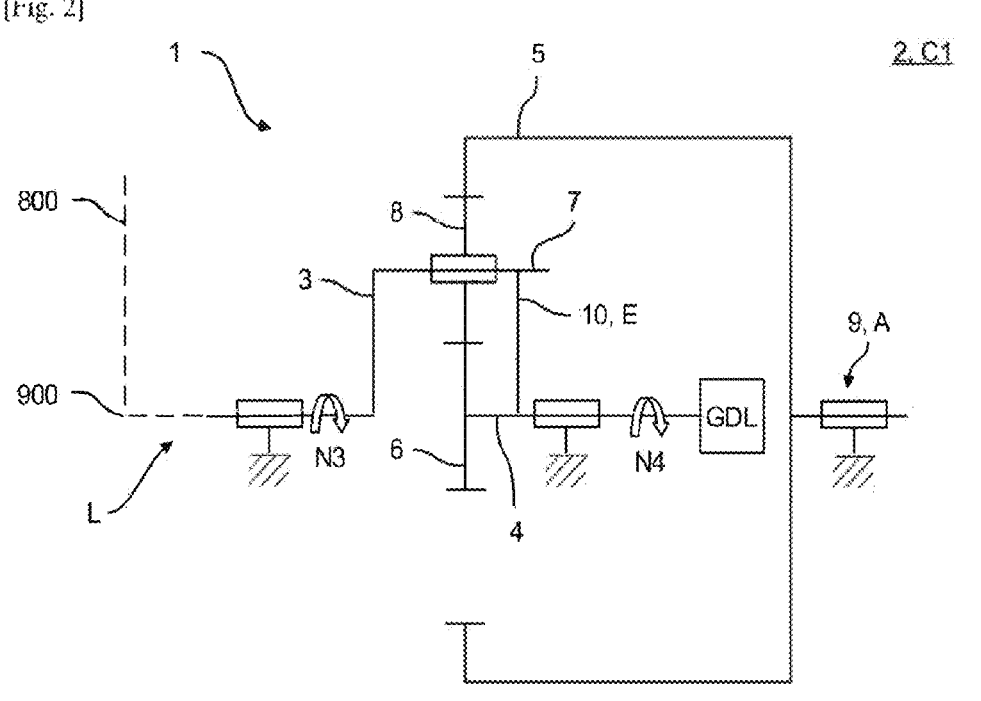

[Fig. 3]
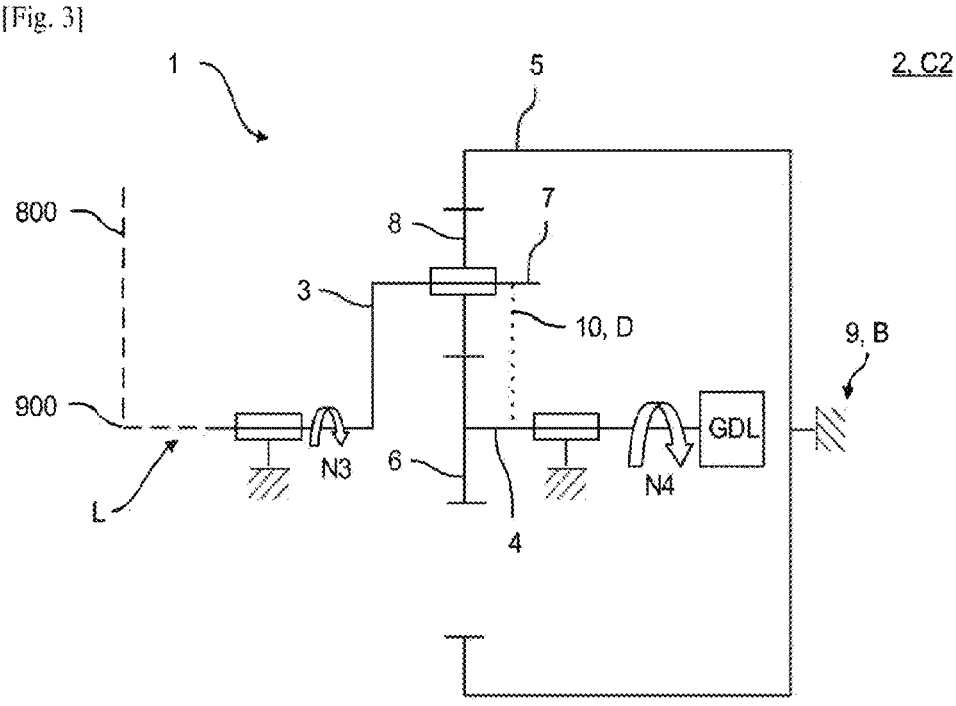
[Fig. 4]
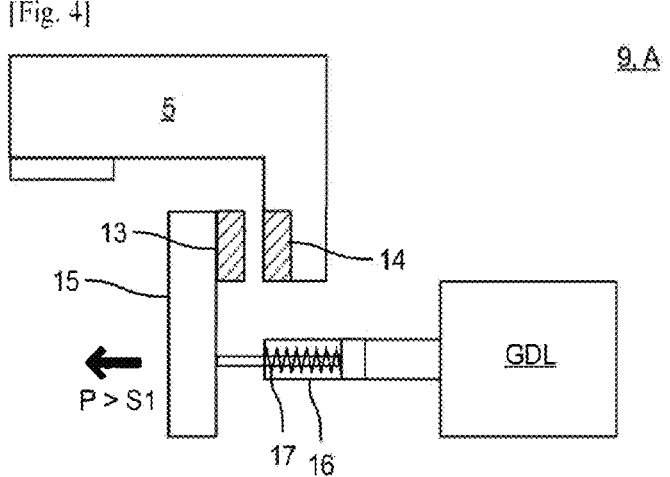

[Fig. 5]
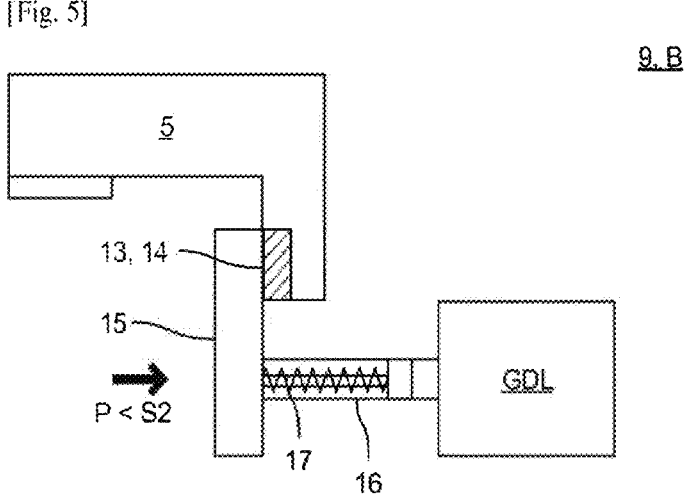
[Fig. 6]
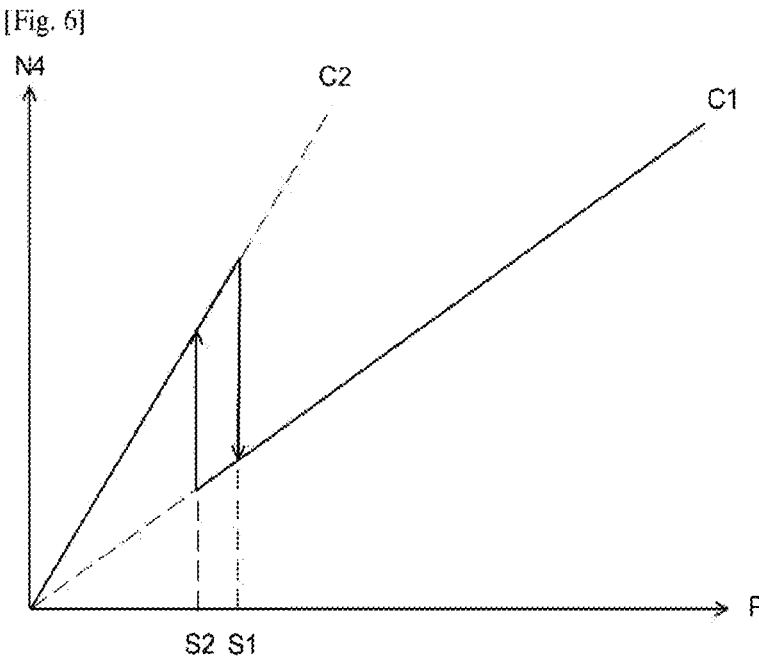

[Fig. 7]
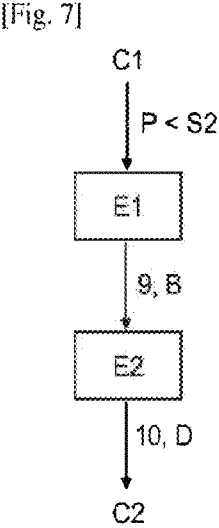
[Fig. 8]
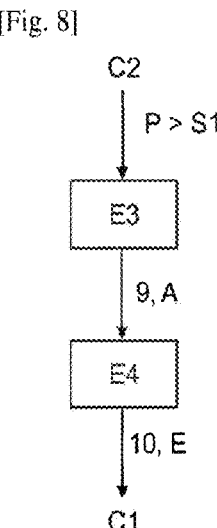

[Fig. 9]
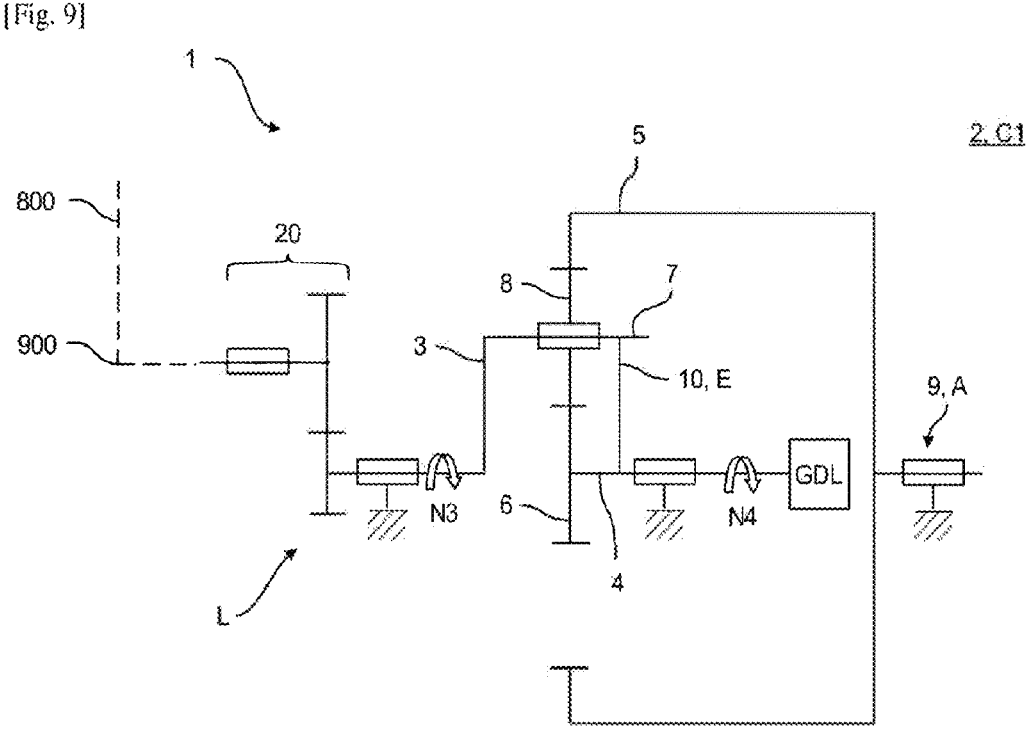

GEAR CHANGING SYSTEM FOR AN ACCESSORY GEARBOX OF AN AIRCRAFT TURBINE ENGINE AND METHOD OF USE

TECHNICAL FIELD

The present invention relates to an accessory gearbox for an aircraft turbine engine, in particular, a gear changing system for such a box and its method of use.

As is well known, an aircraft turbine engine propels an aircraft by accelerating a flow of air circulating in the turbine engine through one (or more) compressors, a combustion chamber and one (or more) turbines. The turbine is coupled to the compressor by at least one turbine engine shaft.

An aircraft turbine engine is known to comprise an Accessory GearBox, known to the person skilled in the art by the acronym AGB. The accessory gearbox comprises at least one input coupled to several parallel shaft lines. The input is configured to receive a driving torque from a turbine engine shaft, in particular by means of a radial arm and an angular gear. In operation, the torque received by the input is transmitted to each shaft line. One or more apparatus aircraft in series are mounted on each line of shafts, such as a lubrication unit, a fuel pump, an electrical generator, a starter and an oil separator, for example.

In a known way, a lubrication unit (GDL) is supplied by a reservoir of lubricating fluid. The lubrication unit typically comprises several pumps, including at least one supply pump designed to supply the various circuits of the aircraft turbine engine with lubricating fluid at a flow rate and a pressure adapted to the speed of the turbine engine. The pump is usually driven by a line of shafts with a constant reduction ratio, so that the drive speed is proportional to the speed of the turbine engine shaft.

In practice, during sub-idle speed of the aircraft turbine engine, the flow rate and the pressure of lubricating fluid supplied by the lubrication unit are insufficient. The speed of the turbine engine shaft is too low to ensure a sufficient drive to certain circuits of the pump, which may lead to damage to the turbine engine, particularly through seizure. The sub-idle speed may occur, for example, when an aircraft turbine engine is being started up, or when the turbine engine fan or propeller is windmilling, i.e. in autorotation, or during maintenance, such as washing the fan.

One solution would be to increase the size of the pump. However, this would undesirably increase the complexity and overall dimension of the lubrication unit in the accessory gearbox. In particular, it is difficult to size a pump to deliver a significant flow rate at very low speed.

It is known from US2022010733A1 that torque may be extracted from an aircraft turbine engine to drive an output shaft by means of an epicyclic gear train, a clutch and a brake. Above a threshold oil pressure supplied by a pump driven by the turbine engine, the brake is activated to block the ring gear of the epicyclic gear train and increase the speed of the output shaft. Such a device is not designed to control the lubrication, and even if it were diverted to this use, would result in reduced lubrication at low speed.

US2021102499A1 also describes a drive system for driving an accessory gearbox that may be coupled to both the low-pressure shaft and the high-pressure shaft. CN106438880A and U.S. Pat. No. 11,364,797B1 teach a multi-speed transmission system for a vehicle.

The invention aims to eliminate at least some of these disadvantages.

SUMMARY

The invention relates to a gear changing system for driving at least one apparatus through an accessory gearbox of an aircraft turbine engine, said gear changing system comprising an input shaft and an output shaft configured to be driven in rotation by the input shaft, said output shaft being configured to be connected to a rotating portion of the apparatus.

The invention is remarkable in that the gear changing system comprises:

An epicyclic gear train comprising a ring gear mounted to rotate freely, a sun gear secured to the output shaft, and a planet carrier comprising at least one planet gear, the planet carrier being secured to the input shaft, A clutch device configured, in an engaged position, to couple the input shaft and the output shaft, and in a disengaged position, to uncouple the input shaft and the output shaft, A locking device configured, in a connected position, to prevent the rotation of the ring gear, and in a disconnected position, to allow the rotation of the ring gear, The gear changing system comprising:

A first configuration, wherein the clutch device is in the engaged position and the locking device is in the disconnected position, so as to drive the output shaft at a speed equal to the speed of the input shaft, and A second configuration, wherein the clutch device is in the disengaged position and the locking device is in the connected position, so as to drive the output shaft at a speed greater than the speed of the input shaft, Advantageously, the gear changing system allows an output shaft to be driven at two different constant transmission ratios relative to an input shaft. The gear changing system also comprises a small overall dimension thanks to the epicyclic gear train, making it easy to integrate into an aircraft turbine engine accessory gearbox. The invention thus allows several different drive speeds to be provided for an aircraft apparatus mounted in an accessory gearbox, without a significant increase in the overall dimension.

According to one aspect of the invention, the clutch device is configured to automatically uncouple the input shaft and the output shaft when the rotational speed of the output shaft is greater than the rotational speed of the input shaft. Advantageously, no control of the clutch device is required, either by numerical control or human intervention. This makes it simple, convenient and immediate to switch from the disengaged position to the engaged position and vice versa. In this way, the control of the locking device allows the clutch device to be controlled directly.

According to one aspect of the invention, the clutch device is in the form of a freewheel, preferably of the overrunning clutch type. Such a clutch device is simple and inexpensive.

According to one aspect of the invention, the locking device is configured, in the connected position, to cooperate with the ring gear by means of a positive-locking connection. This ensures an effective mechanical locking in a simple and practical way.

According to one aspect of the invention, the locking device comprises a piston that may move in translation between the connected position and the disconnected position, the piston preferably being equipped with a return spring. The return force of the spring and the pressure of the lubricating fluid together allow the piston to move automatically and efficiently between the connected position and the disconnected position.

The invention also relates to an aircraft turbine engine accessory gearbox comprising a gear changing system as previously described.

According to one aspect of the invention, the accessory gearbox comprises at least one lubrication unit connected to the output shaft of the gear changing system, a lubricating fluid circulating in the lubrication unit at a variable pressure as a function of the speed of the output shaft, the locking device being configured to be moved automatically from the connected position to the disconnected position when the lubricating fluid pressure is greater than a first predetermined lubricating fluid pressure threshold. Advantageously, no control of the locking device is required, either by numerical control or human intervention. This makes it simple, convenient and immediate to switch from the connected position to the connected position and vice versa. The automatic displacement of the clutch device and of the locking device work in synergy to provide a fully automated operation of the gear changing system. Advantageously, the invention allows a faster build-up of pressure and flow rate in the lubrication circuit.

According to a preferred aspect, the locking device is configured to be moved automatically from the disconnected position to the connected position when the pressure of the lubricating fluid is lower than a second predetermined threshold, preferably lower than the first threshold. The switching between the first configuration and the second configuration of the gear changing system is therefore implemented quickly, thanks to hysteresis.

According to one aspect of the invention, the accessory gearbox comprises at least one aircraft apparatus coupled to the output shaft, said aircraft apparatus preferably being in the form of a lubrication unit. The invention thus allows to provide several different drive speeds for an aircraft apparatus mounted in an accessory gearbox, in particular depending on the speed of the aircraft turbine engine. In the case of the lubrication unit, this allows to ensure a sufficient lubrication of the aircraft turbine engine at low speeds, to avoid the risk of wear due to seizure, as in the prior art.

The invention also relates to an aircraft turbine engine comprising an accessory gearbox as described above.

The invention also relates to a method for using the gear changing system as previously described, wherein the gear changing system is initially in the first configuration, wherein the clutch device is in the engaged position and the locking device is in the disconnected position, the method of use comprising:

A step of displacing the locking device into the connected position and

A step of displacing the clutch device to the disengaged position, so that the gear changing system is in the second configuration.

The invention also relates to a method for using the gear changing system as previously described, wherein the gear changing system is initially in the second configuration, wherein the clutch device is in the disengaged position and the locking device is in the connected position, the method of use comprising:

A step of displacing the locking device into the disconnected position, and

A step of displacing the clutch device into the engaged position, so that the gear changing system is in the first configuration.

According to a preferred aspect, the step of displacing the locking device is implemented before the step of displacing the clutch device. Preferably, the step of displacing the clutch device is carried out automatically following the step of displacing the locking device. Advantageously, the implementation of the locking device displacement step allows the speed differential between the input shaft and the output shaft to be modified, thereby automatically triggering the implementation of the clutch device displacement step.

DRAWINGS

The invention will be better understood on reading the following description, given by way of example, with reference to the following figures, given by way of non-limiting examples, wherein identical references are given to similar objects.

FIG. 1 is a schematic representation in longitudinal cross-section of an aircraft turbine engine comprising an accessory gearbox according to one embodiment of the invention.

FIG. 2 is a schematic representation of an accessory gearbox with a gear changing system in the first configuration according to one embodiment of the invention.

FIG. 3 is a schematic representation of an accessory gearbox with a gear changing system in the second configuration according to one embodiment of the invention.

FIG. 4 is a schematic representation of the locking device for locking the ring gear of the gear changing system of FIG. 2 in the disconnected position.

FIG. 5 is a schematic representation of the locking device for locking the ring gear of the gear changing system in FIG. 3 in the connected position.

FIG. 6 is a schematic representation of the evolution of the output shaft speed as a function of the pressure of the lubricating fluid in the lubrication unit of the accessory gearbox in FIGS. 2 and 3.

FIG. 7 is a schematic representation of the method for using the gear changing system when travelling in the second configuration according to one embodiment of the invention.

FIG. 8 is a schematic representation of the method for using the gear changing system during the displacement in the first configuration according to one embodiment of the invention.

FIG. 9 is a schematic representation of an accessory gearbox with a gear changing system in the first configuration according to another embodiment of the invention.

It should be noted that the figures set out the invention in detail in order to implement the invention, said figures of course being able to be used to better define the invention if necessary.

DETAILED DESCRIPTION

The present invention relates to an accessory gearbox for an aircraft turbine engine, in particular, a gear changing system for such a box and its method of use.

As illustrated in FIG. 1, an aircraft turbine engine 100, in this example of the double flow type extending along a longitudinal axis X, provides the propulsion for an aircraft from the acceleration of a flow of air circulating in the turbine engine 100 through, in particular, one or more compressors 300, 310, a combustion chamber 400 and one or more turbines 500, 510. The turbine 500, 510 is coupled to the compressor 300, 310 by at least one turbine engine shaft 200, 210.

As illustrated in FIG. 1, an aircraft turbine engine 100 comprises an Accessory GearBox 1, known to the person skilled in the art by the abbreviation AGB. The accessory gearbox 1 typically extends outside the compressors or compressors 300, 310 with respect to the longitudinal axis X, in this example, outside the secondary duct VS.

With reference to FIG. 1, the accessory gearbox 1 comprises at least one input coupled to a plurality of parallel shaft lines (a shaft line L is shown in FIGS. 2 and 3). The input is configured to receive a drive torque from a turbine engine shaft 200, 210, in particular, by means of a radial arm 800 and an angular gear 900. In this example, the radial arm 800 extends into a guide member, referred to as the "Outlet Guide Vane" or OGV for short, extending radially into the secondary duct VS. In operation, the torque received by the input is transmitted to each shaft line. One or more apparatus aircraft in series are mounted on each line of shafts, such as a lubrication unit, a fuel pump, an electrical generator, a starter and an oil separator, for example.

FIGS. 2 and 3 show a shaft line L of the accessory gearbox 1, on which a lubrication unit GDL is mounted. The lubrication unit GDL is supplied by a reservoir of lubricating fluid (not shown). The lubrication unit GDL comprises several pumps, including at least one supply pump (not shown) sized to supply the various circuits of the aircraft turbine engine with lubricating fluid at a flow rate and a pressure adapted to the speed of the turbine engine 100. The pump is driven by the torque of the turbine engine shaft 200, 210 transmitted by the radial arm 800 and the angular gear 900.

With reference to FIGS. 2 and 3, the invention relates to a gear changing system 2 for driving one or more apparatus, such as the lubrication unit GDL, via an accessory gearbox 1. The gear changing system 2 comprises:

An input shaft 3 and an output shaft 4 configured to be driven in rotation by the input shaft 3, An epicyclic gear train comprising a ring gear 5 mounted to rotate freely, a sun gear 6 secured to the output shaft 4, and a planet carrier 7 secured to the input shaft 3 and comprising one or more planet gears 8, A clutch device 10 configured, in an engaged position E, to couple the input shaft 3 and the output shaft 4, and in a disengaged position D, to uncouple the input shaft 3 and the output shaft 4, and A locking device 9 configured, in a connected position B, to prevent the rotation of the ring gear 5 and, in a disconnected position A, to allow the rotation of the ring gear 5.

Also according to the invention, the gear changing system 2 comprises:

A first configuration C1 shown in FIG. 2, wherein the clutch device 10 is in the engaged position E and the locking device 9 is in the disconnected position A, so as to drive the output shaft 4 at a speed N4 equal to the speed N3 of the input shaft 3, and A second configuration C2 illustrated in FIG. 3, wherein the clutch device 10 is in the disengaged position D and the locking device 9 is in the connected position B, so as to drive the output shaft 4 at a speed N4 greater than the speed N3 of the input shaft 3.

The gear changing system 2 allows to drive an output shaft 4 from the rotation of an input shaft 3 according to two different constant reduction ratios, namely a first transmission ratio R1 verifying R1=N4/N3=1 in the first configuration C1 and a second transmission ratio R2 verifying the relationship R2>R1 in the second configuration C2. Preferably, the second transmission ratio R2 is R2=N4/N3 and R2>3. The epicyclic gear train also means that the gear changing system 2 has a very little overall dimension.

In the example shown in FIGS. 2 and 3 illustrating a preferred embodiment of the invention, the gear changing system 2 is integrated into the accessory gearbox 1 and mounted on the shaft line L of the lubrication unit GDL. The lubrication unit GDL is mounted on the output shaft 4, corresponding to the output of the epicyclic gear train. The input shaft 3, corresponding to the input of the epicyclic gear train, is coupled to the input of the accessory gearbox 1 and receives the torque from the turbine engine shaft 200, 210 (FIG. 1).

According to a preferred aspect illustrated in FIG. 9, the gear changing system 2 also comprises a single gear train 20, equipped with two pinions of different diameters, in order to modify the speed received by the lubrication unit GDL according to a constant transmission ratio R, preferably verifying R>1 and preferably R<2. The single gear train 20 is mounted, for example, between the input of the accessory gearbox 1 and the input shaft 3 of the epicyclic gear train (see FIG. 9), or between the output shaft 4 of the epicyclic gear train and the lubrication unit GDL. The total transmission ratio Rtot between the lubrication unit GDL and the input of the accessory gearbox 1 thus verifies Rtot=R*R1=R in the first configuration C1, and Rtot=R*R2>R*R1 in the second configuration C2.

It goes without saying that the gear changing system 2 could be mounted on any shaft line of the accessory gearbox 1, other than that of the lubrication unit GDL, in order to be able to drive one or more other aircraft apparatus with two different transmission ratios. Advantageously, in the case of a shaft line with several apparatus, the gear changing system 2 allows all the apparatus to change gear simultaneously. Furthermore, according to another aspect of the invention, the gear changing system 2 could be integrated into an aircraft apparatus and not into the accessory gearbox 1.

The gear changing system 2 allows the drive of the lubrication unit GDL to be modified as a function of the speed of the aircraft turbine engine 100. The second configuration C2, with a higher transmission ratio R2 than that R1 of the first configuration C1, is particularly suitable for the low idle speed of the aircraft turbine engine 100 in order to compensate for the low speed of the turbine engine shaft 200, 210. This ensures that the pump of the lubrication unit GDL is sufficiently driven at a suitable flow rate and pressure, so as to avoid the risk of damaging the turbine engine 100 as in the prior art, in particular by seizing. The sub-idle regime is observed in particular when the aircraft turbine engine 100 is starting up or when the turbine engine is windmilling, i.e. when the turbine engine 100 is stationary and turning at very low speed under the sole effect of the wind, better referred to as "windmilling". The low idle speed may also be observed during a maintenance of the aircraft turbine engine 100. The first configuration C1, with a reduction ratio R1=1, allows the pump of the lubrication unit GDL to be driven in the same way as in the prior art in the speeds of the turbine engine 100 other than sub-idle.

According to a preferred aspect of the invention, the clutch device 10 is configured to engage and disengage the input shaft 3 and the output shaft 4 automatically as a function of the speed differential between the input shaft 3 and the output shaft 4. More specifically, the clutch device 10 is configured to automatically uncouple the input shaft 3 and the output shaft 4 when the speed N4 of the output shaft 4 is greater than the speed N3 of the input shaft 3.

There is no need for human intervention. The displacement between the engaged position E and the disengaged position D of the clutch device 10 is preferably effected by a mechanical mechanism triggered directly by the speed differential between the input shaft 3 and the output shaft 4. Advantageously, the clutch device 10 has a simple, low-cost structure that is easy to integrate and has no electrical or electronic control elements.

Preferably, the clutch device 10 is in the form of a freewheel, preferably of the overrunning clutch type. The freewheel comprises a first ring secured to the input shaft 3 and a second ring secured to the output shaft 4 and mounted coaxially opposite the first ring. The freewheel comprises one or more elements for coupling the second ring to the first ring in rotation, preferably by abutment, such as knuckles or rollers. In the engaged position E, the second ring is blocked relative to the first ring. In the disengaged position D, the second ring is in oversteer relative to the first ring. The output shaft 4 rotates in the same direction in the engaged position E and in the disengaged position D. A freewheel of the overrunning clutch type, which is known per se to the person skilled in the art, is not further described.

With reference to FIGS. 4 and 5 and as previously described, the locking device 9 comprises:

A disconnected position A illustrated in FIG. 4 wherein the locking device 9 allows the rotation of the ring gear 5 of the epicyclic gear train, and A connected position B shown in FIG. 5, wherein the locking device 9 prevents the rotation of the ring gear 5 of the epicyclic gear train.

According to a preferred aspect illustrated in FIGS. 4 and 5, the locking device 9 is configured, in the connected position B, to cooperate with the ring gear 5 by clutching, preferably by positive-locking connection. The locking device 9 therefore comprises a dog clutch member 15 comprising grooves 13 configured to cooperate with complementary splines 14 on the ring gear 5, so as to block the rotation of the ring gear 5.

According to a preferred aspect illustrated in FIGS. 4 and 5, the locking device 9 comprises a piston 16 mounted for translational movement between the connected position B and the disconnected position A. The dog clutch member 15 is mounted on the piston 16 so as to be movable between the connected position B, wherein the splines 13 cooperate with the complementary splines 14 on the ring gear 5, and the disconnected position A, wherein the splines 13 are held at a distance from the complementary splines 14 on the ring gear 5. The ring gear 5 is mounted so that it may not move in translation.

Preferably, the piston 16 also comprises a return spring 17, the return force of which allows the piston 16 to be moved in synergy with the pressure P of the lubricating fluid.

According to a preferred aspect illustrated in FIGS. 4 and 5, the locking device 9, and more precisely the piston 16, moves automatically under the action of the pressure P of the lubricating fluid circulating in the lubrication unit GDL and of the return spring 17. The pressure P of the lubricating fluid varies as a function of the speed of the aircraft turbine engine 100, increasing with the speed N3 of the input shaft 3.

With reference to FIG. 6. the pressure P of the lubricating fluid, when it is greater than a first threshold S1, is configured to move the locking device 9 from the connected position B (FIG. 5) to the disconnected position A (FIG. 4). The pressure P of the lubricating fluid also allows to load the return spring 17. In the disconnected position A shown in FIG. 4, the pressure P of the lubricating fluid is configured to act on the piston 16 so as to keep the dog clutch member 15 away from the ring gear 5. Still in the disconnected position A shown in FIG. 4, the pressure P of the lubricating fluid keeps the spring 17 in a loaded state.

Still referring to FIG. 6, when the pressure P of the lubricating fluid is below a second threshold S2, the return spring 17 exerts a counter-return force greater than the pressure P which allows to move the locking device 9 from the disconnected position A (FIG. 4) towards the connected position B (FIG. 5). In the connected position B shown in FIG. 5, the return force of the spring 17 holds the crenellations 13 of the dog clutch member 15 in cooperation with the complementary crenellations 14 of the ring gear 5.

Preferably, the first threshold S1 of pressure P is chosen so that the speed of the low-pressure turbine engine shaft 200 is greater than the maximum reel speed, for example of the order of 600 rpm, and less than the average idling speed, for example of the order of 10,000 rpm. Preferably, the second threshold S2 of pressure P is lower than the first threshold S1, such a hysteresis being generated by the hydraulic system of the lubrication unit GDL and depending on the hydraulic load. This hysteresis allows a rapid movement from the first configuration C1 to the second configuration C2 and vice versa, as will be seen later.

No human intervention is therefore required to move the locking device 9. The automatic displacement of the locking device 9 and the clutch device 10 allow in synergy to switch automatically from the first configuration C1 to the second configuration C2 of the gear changing system 2, and vice versa.

FIG. 7 illustrates a method for using the gear changing system 2 to change from the first configuration C1 to the second configuration C2, for example during a deceleration of the aircraft turbine engine 100 towards the low idle speed. The aircraft turbine engine 100 is initially at a speed higher than the sub-idle speed, for example at ground idle or cruising speed, and the lubricating fluid circulating in the lubrication unit GDL comprises a pressure P higher than the second threshold S2. The gear changing system 2 is initially in the first configuration C1. In practice, the input shaft 3, the ring gear 5 and the output shaft 4 move together at the same rotational speed N3, N4.

With reference to FIGS. 6 and 7, the method comprises:

A step E1 of displacing the locking device 9 into the connected position B. The displacement step E1 is preferably implemented automatically when the pressure P of the lubricating fluid falls below the second threshold S2, preferably due to the return force of the spring 17 which presses the dog clutch member 15 against the ring gear 5. At the end of the displacement step E1, the ring gear 5 is blocked against rotation, preferably by means of a positive-locking connection. The input shaft 3 then displaces in the ring gear 5 and drives the output shaft 4 at a speed N4 greater than the speed N3 of the input shaft 3.

A step E2 of displacing the clutch device 10 into the disengaged position D. Preferably, the displacement step E2 is implemented automatically by freewheeling when the speed N4 of the output shaft exceeds the speed N3 of the input shaft 3 following the displacement step E1. The displacement step E1 leads to the displacement step E2 automatically and without delay. At the end of the displacement step E2, the gear changing system 2 is in the second configuration C2, which offers optimised performance of the lubrication unit GDL during the sub-idle speed of the aircraft turbine engine 100.

FIG. 8 illustrates a method for using the gear changing system 2 to change from the second configuration C2 to the first configuration C1, for example when the speed of the aircraft turbine engine 100 is increased from the sub-idle speed. The aircraft turbine engine 100 is initially in a sub-idle speed and the lubricating fluid circulating in the lubrication unit GDL comprises a pressure P below the first threshold S1. The gear changing system 2 is initially in the second configuration C2. In practice, the output shaft 4 is driven at a speed N4 greater than the speed N3 of the input shaft 3, the ring gear 5 being stationary.

With reference to FIGS. 6 and 8, the method comprises:

A step E3 of displacing the locking device 9 into the disconnected position A. The displacement step E3 is preferably implemented automatically when the pressure P of the lubricating fluid becomes greater than the first threshold S1 and displaces the piston 16 to move the dog clutch member 15 away from ring gear 5. At the end of the displacement stage E1, the ring gear 5 is free to rotate, which reduces the speed of the output shaft 4 relative to the input shaft 3.

A step E4 of displacing the clutch device 10 in the engaged position E. Preferably, the displacement step E4 is implemented automatically by locking the free-wheel when the speed N4 of the output shaft 4 is equal to the speed N3 of the input shaft 3 following the displacement step E3. The displacement step E3 leads to the displacement step E4 automatically and without delay. At the end of the displacement step E4, the gear changing system 2 is in the first configuration C1 and allows an operation of the lubrication pump similar to that of the prior art outside the sub-idle speed of the aircraft turbine engine 100.

In this way, the displacement of the gear changing system 2 is entirely controlled by the speed of the aircraft turbine engine, either automatically as a function of the speed of the input shaft N3.

According to an alternative aspect of the invention, the displacement E2 of the clutch device 10 into the disengaged position D is implemented before the displacement E1 of the locking device 9 into the disconnected position B, with an adapted spring constant of the return spring 17. Similarly, the displacement E4 of the clutch device 10 into the engaged position E is implemented before the movement E3 of the locking device 9 into the connected position A.

The invention claimed is:

1. An accessory gearbox of an aircraft turbine engine comprising at least one lubrication unit and a gear changing system for driving of the lubrication unit, said gear changing system comprising an input shaft and an output shaft configured to be driven in rotation by the input shaft, said output shaft being connected to a rotating portion of the lubrication unit, a lubricating fluid circulating in the lubrication unit at a variable pressure as a function of the speed of the output shaft, said gear changing system comprising:

an epicyclic gear train comprising a ring gear mounted to rotate freely, a sun gear secured to the output shaft, and a planet carrier comprising at least one planet gear, the planet carrier being secured to the input shaft, a clutch device configured, in an engaged position, to couple the input shaft and the output shaft, and in a disengaged position, to uncouple the input shaft and the output shaft, a locking device configured, in a connected position, to prevent the rotation of the ring gear, and in a disconnected position, to allow the rotation of the ring gear, the locking device comprising a piston that may move in translation between the connected position and the disconnected position, the piston being equipped with a return spring and being configured to be moved automatically from the connected position to the disconnected position under the action of the pressure of the lubricating fluid and of the return spring, above a first pressure threshold of the predetermined lubricating fluid, the gear changing system comprising:

a first configuration, wherein the clutch device is in the engaged position and the locking device is in the disconnected position, so as to drive the output shaft at a speed equal to the speed of the input shaft, and a second configuration, wherein the clutch device is in the disengaged position and the locking device is in the connected position, so as to drive the output shaft at a speed greater than the speed of the input shaft.

2. The accessory gearbox according to claim 1, wherein the clutch device is configured to automatically uncouple the input shaft and the output shaft when the rotational speed of the output shaft is greater than the rotational speed of the input shaft.

3. The accessory gearbox according to claim 1, wherein the clutch device is a freewheel.

4. The accessory gearbox according to claim 3, wherein the clutch device is an overrunning clutch type.

5. The accessory gearbox according to claim 1, wherein the locking device is configured, in the connected position, to cooperate with the ring gear by a positive-locking connection.

6. The accessory gearbox according to claim 1, wherein the piston of the locking device is configured to be moved automatically from the disconnected position to the connected position under the action of the pressure of the lubricating fluid and of the return spring when the pressure of the lubricating fluid is lower than a second predetermined threshold.

7. The accessory gearbox according to claim 6, wherein the piston of the locking device is configured to be moved automatically from the disconnected position to the connected position under the action of the pressure of the lubricating fluid and of the return spring when the pressure of the lubricating fluid is lower than the first threshold.

8. A method for using the accessory gearbox according to claim 1, wherein the gear changing system is initially in the first configuration, wherein the clutch device is in the engaged position and the locking device is in the disconnected position, the method comprising:

displacing the locking device into the connected position and displacing the clutch device to the disengaged position, so that the gear changing system is in the second configuration.

* * * * *